United States Patent
Dickens et al.

(10) Patent No.: US 11,347,374 B2
(45) Date of Patent: May 31, 2022

(54) SYSTEMS AND METHODS FOR MANAGING SHARED CONTENT

(71) Applicant: META PLATFORMS, INC., Menlo Park, CA (US)

(72) Inventors: Joshua Barton Dickens, Oakland, CA (US); William Samuel Bailey, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 258 days.

(21) Appl. No.: 15/354,308

(22) Filed: Nov. 17, 2016

(65) Prior Publication Data

US 2018/0136797 A1     May 17, 2018

(51) Int. Cl.
*H04L 51/52*     (2022.01)
*G06F 3/0482*     (2013.01)
*G06F 16/9535*     (2019.01)
*H04L 51/00*     (2022.01)

(52) U.S. Cl.
CPC ........ *G06F 3/0482* (2013.01); *G06F 16/9535* (2019.01); *H04L 51/32* (2013.01); *H04L 51/16* (2013.01)

(58) Field of Classification Search
CPC ...... G06Q 50/00; G06Q 50/01; G06Q 10/107; H04L 51/32; H04L 67/306; G06F 3/0482; G06F 3/0484; G06F 17/30867; G06F 17/30; G06F 17/3089
USPC ....................................................... 705/319
See application file for complete search history.

(56) References Cited

U.S. PATENT DOCUMENTS

| | | | | |
|---|---|---|---|---|
| 2004/0003352 | A1* | 1/2004 | Bargeron | G06F 17/24 715/230 |
| 2009/0271247 | A1* | 10/2009 | Karelin | G06Q 10/10 705/319 |
| 2009/0271283 | A1* | 10/2009 | Fosnacht | G06Q 30/0601 705/26.1 |
| 2012/0324002 | A1* | 12/2012 | Chen | G06F 17/30274 709/204 |
| 2013/0332523 | A1* | 12/2013 | Luu | G06Q 30/0251 709/204 |
| 2013/0340089 | A1* | 12/2013 | Steinberg | H04L 51/12 726/27 |

(Continued)

OTHER PUBLICATIONS

"How to Put an Image on YouTube with the YouTube Video Editor" (Published on Jan. 19, 2015 by Drost Video) https://www.youtube.com/watch?v=Q16Ul8XcJXo.*

(Continued)

*Primary Examiner* — Rinna Yi
(74) *Attorney, Agent, or Firm* — Sheppard Mullin Richter & Hampton LLP

(57) ABSTRACT

Systems, methods, and non-transitory computer-readable media can provide an interface in which a content feed of a user is presented, the content feed including at least one first post that was authored by the user and that includes a first content item, wherein the interface is presented on a display screen of a computing device. A determination is made that the user has selected an option to update the first post to include one or more additional content items. A set of content items is provided for selection through the interface. The first post is updated to include at least one content item that was selected by the user.

20 Claims, 10 Drawing Sheets

(56) References Cited

U.S. PATENT DOCUMENTS

| | | | |
|---|---|---|---|
| 2014/0056574 A1* | 2/2014 | Mostoufi | G11B 27/02 386/278 |
| 2014/0075289 A1* | 3/2014 | Brant | G06F 17/217 715/234 |
| 2014/0137043 A1* | 5/2014 | Matas | G06F 3/0488 715/835 |
| 2015/0127748 A1* | 5/2015 | Buryak | G06F 16/9535 709/206 |
| 2015/0278367 A1* | 10/2015 | Chang | G06F 16/9535 707/723 |

OTHER PUBLICATIONS

"How to insert an image into a Discussion reply" (Published on Jul. 10, 2014 by BlueSofaMedia) https://www.youtube.com/watch?v=lsPTv-yaFsE.*

\* cited by examiner

500

Provide an interface in which a content feed of a user is presented, the content feed including at least one post that was authored by the user and that includes a first content item, wherein the interface is presented on a display screen of a computing device
502

Determine that the user has selected an option to update the post to include one or more additional content items
504

Provide a set of content items that relate to the first content item for selection through the interface
506

Update the post to include at least one content item that was selected by the user
508

FIGURE 5

SYSTEMS AND METHODS FOR MANAGING SHARED CONTENT

FIELD OF THE INVENTION

The present technology relates to the field of content sharing. More particularly, the present technology relates to techniques for sharing content with users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to provide an interface in which a content feed of a user is presented, the content feed including at least one first post that was authored by the user and that includes a first content item, wherein the interface is presented on a display screen of a computing device. A determination is made that the user has selected an option to update the first post to include one or more additional content items. A set of content items is provided for selection through the interface. The first post is updated to include at least one content item that was selected by the user.

In some embodiments, the systems, methods, and non-transitory computer readable media are configured to determine one or more content items relating to the first content item to be included in the set and provide a media tray through the interface in which respective thumbnails of the set of content items are presented.

In some embodiments, the systems, methods, and non-transitory computer readable media are configured to determine that the first content item and at least one content item stored in the computing device are associated with a same, or similar, geographic location.

In some embodiments, the systems, methods, and non-transitory computer readable media are configured to determine that a timestamp associated with at least one content item stored in the computing device is within a threshold range of a timestamp associated with the first content item.

In some embodiments, the systems, methods, and non-transitory computer readable media are configured to determine that subject matter captured in at least one content item stored in the computing device has a threshold overlap with subject matter captured in the first content item.

In some embodiments, the systems, methods, and non-transitory computer readable media are configured to determine that the content feed includes a second post that was authored by the user and that includes a second content item, determine that the first post and the second post should be merged into a single post, and cause the first post and the second post to be merged into the single post, wherein the single post includes both the first content item and the second content item.

In some embodiments, the systems, methods, and non-transitory computer readable media are configured to determine that the first content item and the second content item are associated with a same, or similar, geographic location and determine that a timestamp associated with the first content item is within a threshold range of a timestamp associated with the second content item.

In some embodiments, the systems, methods, and non-transitory computer readable media are configured to determine that the first post and the second post are associated with a same, or similar, caption.

In some embodiments, the systems, methods, and non-transitory computer readable media are configured to determine one or more first interactions that were received for the first post from one or more other users, determine one or more second interactions that were received for the second post from one or more other users, and associate the first interactions and the second interactions with the single post.

In some embodiments, the systems, methods, and non-transitory computer readable media are configured to provide at least one notification to the user to confirm the merging of the first post and the second post into the single post.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method for sharing content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user. Under conventional approaches, users can share a content item, or an album of content items, in a post published through the social networking system. Once published, modifying the post (or adding more content to the post) can be a burdensome process if even an option at all. Such restrictions can negatively impact the ways in which users interact with one another in the social networking system. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can publish posts through the social networking system. A user post can be updated even after the post has been published through the social networking system. For example, once the post is published along with a first content item (e.g., image), the user may select an option to add one or more second content items to be included in the same post. In some embodiments, content items that were determined to be related to a published post can be recommended to the user to be included in an updated version of the post. In some embodiments, multiple posts by a user that each include related content items can be collapsed into a single post that includes the related content items.

Figure 1:
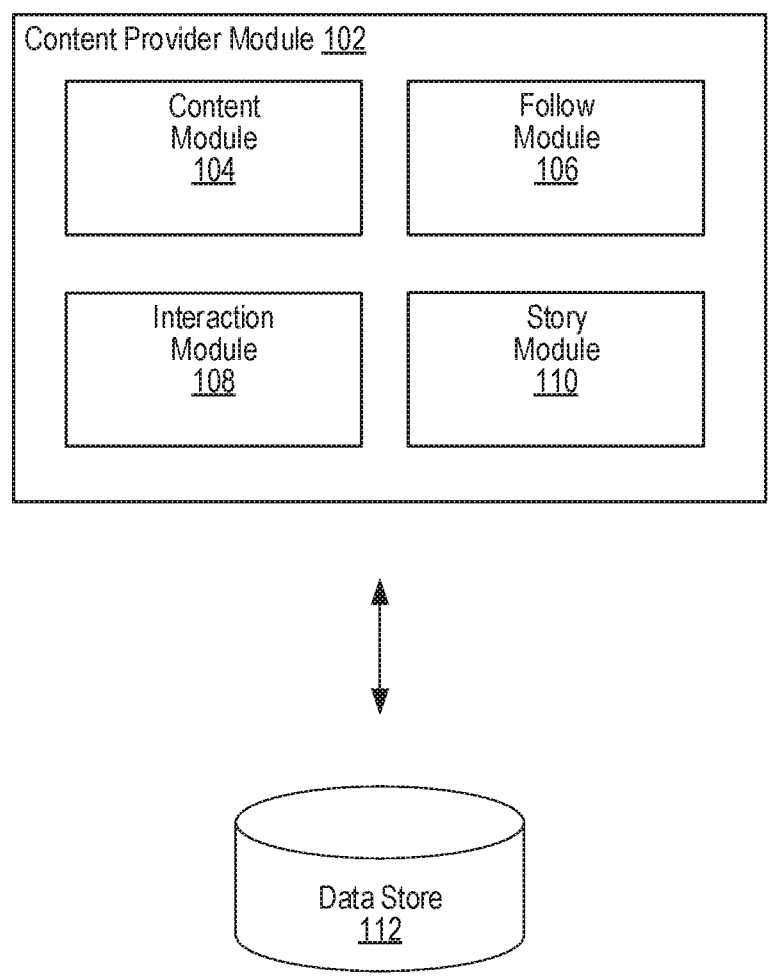
FIG. 1 illustrates an example system including an example content provider module, according to an embodiment of the present disclosure.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a story module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that has been posted by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content module 104 can be configured to provide users with access to content that is posted through a social networking system. For example, the content module 104 can provide a first user with access to content items through an interface that is provided by a software application (e.g., a social networking application) running on a computing device of the first user. The first user can also interact with the interface to post content items to the social networking system. Such content items may include text, images, audio, and videos, for example. For example, the first user can submit a post to be published through the social networking system. In some embodiments, the post can include, or reference, one or more content items. In some embodiments, posts published through the social networking system must include at least one content item.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include reacting to a content item (e.g., selecting an option that corresponds to a particular reaction, e.g., happy, sad, angry, etc.) and sharing a content item, to name some examples. In some embodiments, such information can be stored in a social graph as described in reference to FIG. 6.

In various embodiments, the story module 110 is configured to provide various options for including multiple content items in a post and/or updating posts. For example, in some embodiments, the story module 110 can provide options for amending, or updating, published user posts to include additional content items. More details regarding the story module 110 will be provided below with reference to FIG. 2.

Figure 2:
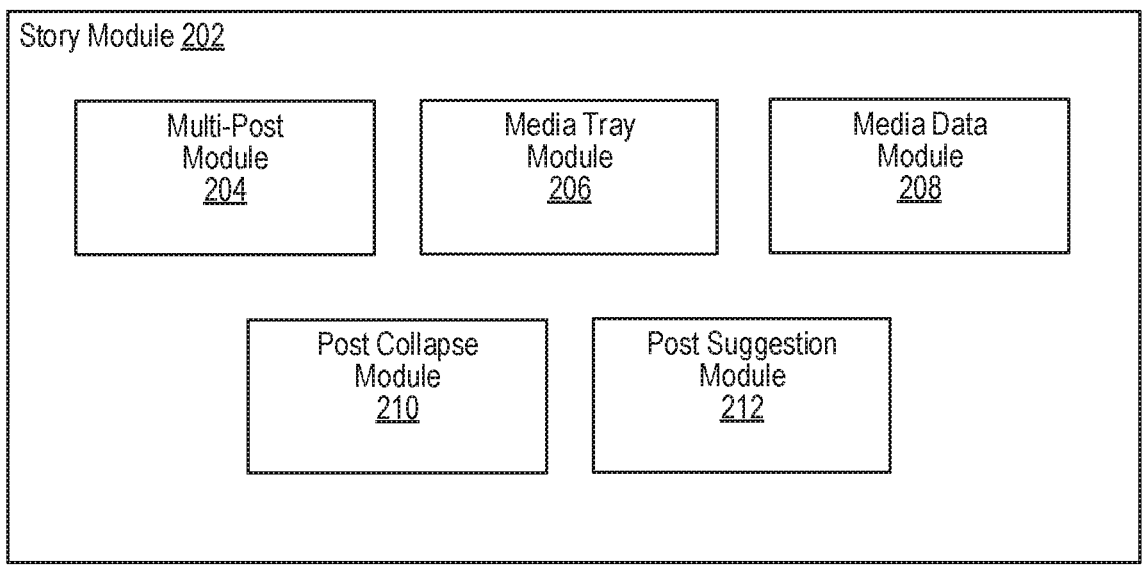
FIG. 2 illustrates an example story module, according to an embodiment of the present disclosure.

FIG. 2 illustrates a story module 202, according to an embodiment of the present disclosure. In some embodiments, the story module 110 of FIG. 1 can be implemented with the story module 202. As shown in the example of FIG. 2, the story module 202 can include a multi-post module 204, a media tray module 206, a media data module 208, a post collapse module 210, and a post suggestion module 212.

In various embodiments, the multi-post module 204 is configured to provide users with one or more options for modifying, or updating, posts that were published through the social networking system. The options for updating posts can be presented in an interface that is provided by a software application (e.g., a social networking application) running on a computing device of a user that authored the posts. In some embodiments, the multi-post module 204 provides an option to add content items to a post that was already published through the social networking system. The user that authored the post can select the option to update the post to include one or more content items. When the user selects the option to add content items to a published post, the media tray module 206 can provide, in the interface, a media tray in which one or more content items are presented for selection. The user can select one or more of these content items through the interface and, once the user selection is confirmed, the published post is updated to include the selected content items. Users of the social networking system that access the updated post will be shown the post along with the newly added content items. In some embodiments, the social networking system boosts the ranking of updated post in the respective content feeds of users in which the post is included (e.g., the content feeds of users following the user that authored the updated post). In such embodiments, the respective score for the post may be boosted by some amount (e.g., weight) in response to the updating. In various embodiments, the media data module 208 can determine which content items are shown in the media tray that is provided by the media tray module 206 as well as other information related to those content items. More details regarding the media data module 208 will be provided below with reference to FIG. 3. In some embodiments, the multi-post module 204 provides an option to remove one or more content items that were included in a post that was published through the social networking system.

In some embodiments, the post collapse module 210 is configured to automatically collapse multiple related posts that were published by a user through the social networking system into a single merged post. For example, in some embodiments, the post collapse module 210 can determine that a user published multiple posts within a threshold amount of time from one another (e.g., within a threshold number of minutes, hours, days, etc.). In such embodiments, the post collapse module 210 can automatically collapse the multiple posts into a single merged post that includes all of the content items that were included in the individual posts. For example, a user may publish a first post including a first content item that was taken while the user was on vacation. Next, the user may publish a second post that includes a second content item within a threshold amount of time. In this example, the post collapse module 210 can automatically collapse the first post and the second post into a single merged post that includes both the first content item and the second content item. In some embodiments, any interactions (e.g., likes, comments, reactions, etc.) received for the individual posts (e.g., the first post and the second post) by other users of the social networking system are propagated to the single merged post. Thus, for example, if a first user and a second user selected an option to like the first post and a third user selected an option to like the second post, then the single merged post can be presented as having received likes from the first user, the second user, and the third user.

Other approaches for automatically collapsing posts are possible. In some embodiments, the post collapse module 210 can determine that a user published multiple posts with related captions. For example, the user may have published a set of posts that each include the same, or similar (e.g., common text, overlapping characters, semantic meaning within a threshold variation, etc.), caption (e.g., "Vacationing in Maui"). In this example, the set of posts can automatically be collapsed into a single merged post based on the posts having the same, or similar, captions. In some embodiments, the post collapse module 210 can determine that a user published multiple posts that include the same, or similar (e.g., overlapping regions, common center, adjacent regions, regions within a threshold distance, etc.), geolocation data. For example, the user may have published a set of posts from Maui, Hi. In this example, the set of posts can automatically be collapsed into a single merged post based on the posts originating from the same, or similar, geographic region. In another example, the set of posts can automatically be collapsed into a single merged post based on the content items in the posts having been taken at the same, or similar, geographic location as indicated, for example, in the respective metadata associated with those content items. In some embodiments, the post collapse module 210 can determine that a user published multiple posts that include the same, or similar, subject matter. For example, the user may have published a set of posts that include content items capturing various animals at a zoo. The content items included in the different posts can be evaluated using a machine learning model (content classifier), as described below, to determine that the different content items capture related subject matter. In this example, the set of posts can automatically be collapsed into a single merged post based on the posts having related subject matter. Depending on the implementation, any of these approaches for merging posts can be used either alone or in combination with one another. In some embodiments, the post collapse module 210 requests user confirmation prior to collapsing a set of posts into a single merged post. In some embodiments, the user has an option to revert the single merged post back to the individual posts that were published by the user.

In some embodiments, when a user is posting one or more content items, the post suggestion module 212 can suggest one or more already published posts to which the content item(s) can appropriately be added instead of creating separate new posts for the content item(s). The suggested posts can be identified using any of the approaches for identifying related content as described above. For example, in some embodiments, a suggested post for adding the content item(s) can be determined based on a shared geographic location between one or more content items included in the post and the content item(s) being posted, based on the subsequent posting of the content item(s) occurring within a threshold amount of time from the publishing of the suggested post, or both.

Figure 3:
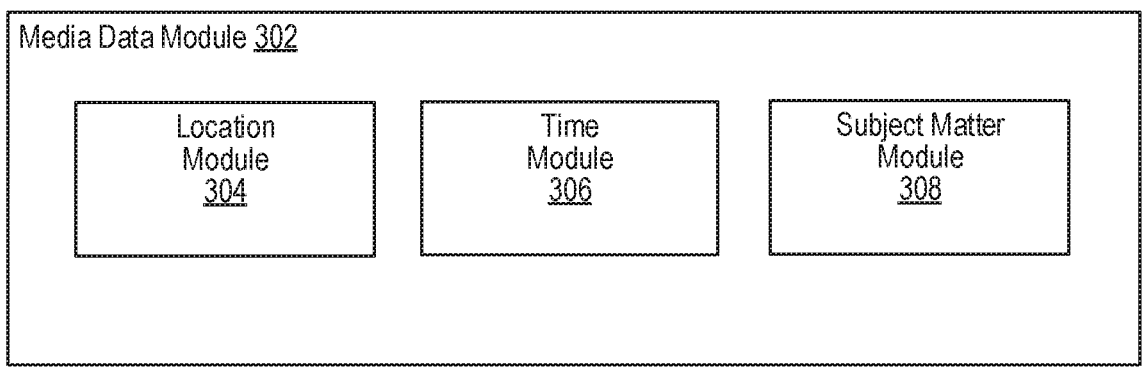
FIG. 3 illustrates an example media data module, according to an embodiment of the present disclosure.

FIG. 3 illustrates a media data module 302, according to an embodiment of the present disclosure. In some embodiments, the media data module 208 of FIG. 2 can be implemented with the media data module 302. As shown in the example of FIG. 3, the media data module 302 can include a location module 304, a time module 306, and a subject matter module 308.

In various embodiments, the media data module 302 is configured to identify one or more content items to be shown in the media tray that is presented in the interface, as described above. In some embodiments, the media data module 302 identifies a set of content items that are available to the user, e.g., content items stored in the computing device of the user. For example, the media data module 302 can identify the last five content items that were added to a content store (e.g., camera roll) in the computing device. In some embodiments, the media data module 302 identifies one or more content items that relate to one or more content items that were already included in the post being updated. For example, if a post that includes a first content item is being updated to include additional content items, the media data module 302 can identify one or more other content items that relate to the first content item.

In some embodiments, the location module 304 can identify related content items based on a respective geographic location associated with the content items. For example, if metadata associated with a second content item indicates that the second content item was captured at the same, or similar, geographic location as the first content item included in the post being updated, the location module 304 can include the second content item in the set of content items that are shown in the media tray.

In some embodiments, the time module 306 can identify related content items based on the respective timestamps associated with the content items. For example, if metadata associated with a second content item indicates that the second content item was captured at the same time (or within some threshold range) as the first content item included in the post being updated, the time module 306 can include the second content item in the set of content items that are shown in the media tray.

In some embodiments, the subject matter module 308 can identify related content items based on the subject matter that was captured in the first content item. For example, a second content item can be shown in the media tray if the subject matter captured in the second content item matches the subject matter captured in the first content item included in the post being updated within some threshold likelihood. In various embodiments, the subject matter module 308 can apply a machine learning model (content classifier) to determine a relationship, or similarity, between content items (e.g., the first content item and the second content item). For example, the subject matter module 308 can determine a probability regarding whether the first content item reflects predetermined subject matter (e.g., identities, or names, of individuals, human faces and other features, objects, activities, products, logos, animals, points of interest, or other concepts). The content classifier can be based on any machine learning technique, including but not limited to a deep convolutional neural network. The content classifier supported by the subject matter module 308 can be trained and tested to determine the subject matter reflected in a content item. In a development phase, contextual cues for a sample set of content items can be gathered. Content classes corresponding to various subject matter can be determined. Correlation of the sample set of content items with the content classes based on the contextual cues can be determined. A training set of content items can be generated from the sample set of content items based on scores indicative of high correlation. The training set of content items can be used to train the content classifier to generate visual pattern templates of the content classes. In an evaluation phase, the content classifier can be applied to a new content item to determine the subject matter reflected in the new content item. In some embodiments, upon processing an input content item, the content classifier outputs a set of content features that correspond to the subject matter reflected in the inputted content item. For each feature, the content classifier can also output a respective probability indicating a likelihood that the feature was found in the subject matter reflected by the inputted content item. The subject matter module 308 can also apply the content classifier to the second content item to determine the subject matter reflected in the content item. The determined subject matter, or features, for the first content item and the second content item can be evaluated to determine whether there is a threshold overlap in the subject matter or features. If a threshold overlap is determined, then the first content item and the second content item are deemed to be related to one another.

Figure 4A:
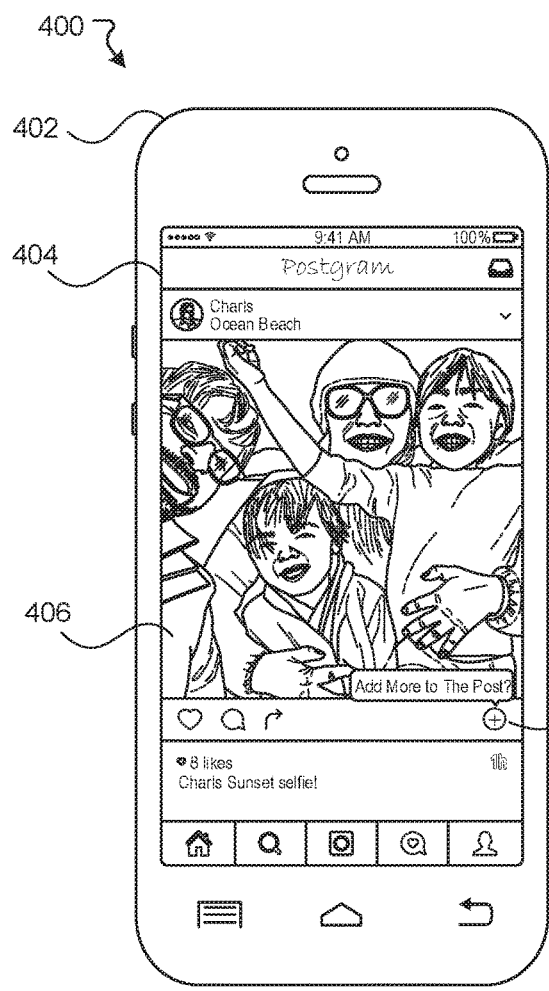
FIGS. 4A-H illustrate example interfaces, according to an embodiment of the present disclosure.

FIG. 4A illustrates an example 400 of an interface 404, according to an embodiment of the present disclosure. In this example, the interface 404 is presented through a display screen of the computing device 402. Further, the interface 404 may be provided through an application (e.g., a web browser, a social networking application, messenger application, etc.) running on the computing device 402 that is configured to interact with a social networking system.

Figure 4B:
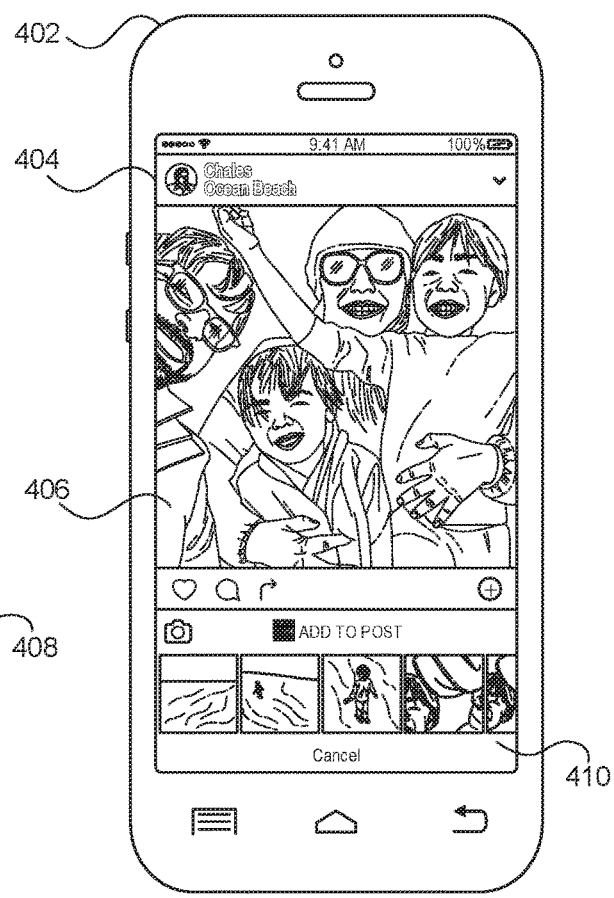
Figures 4C, 4D:
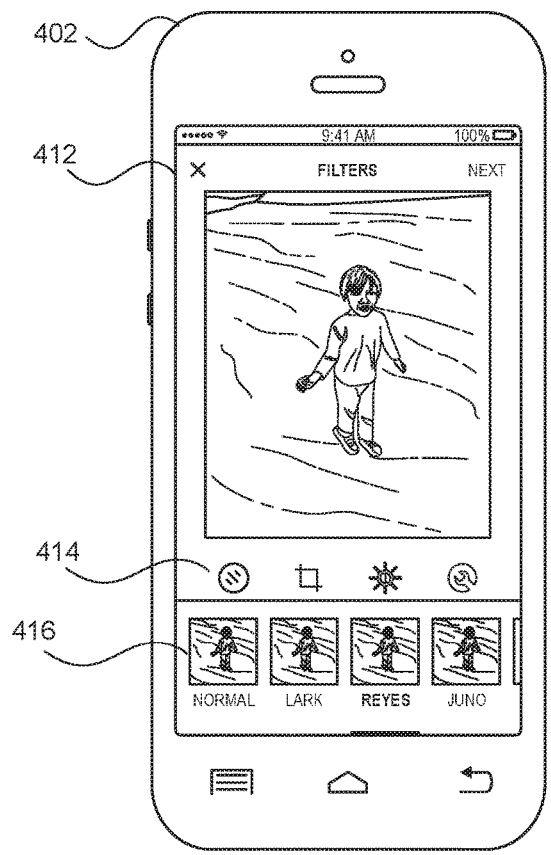
Figure 4E:
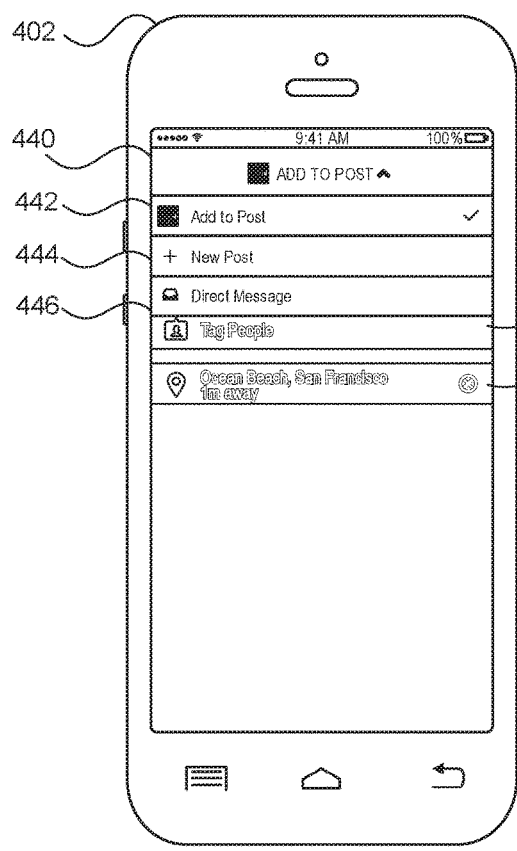
Figure 4F:
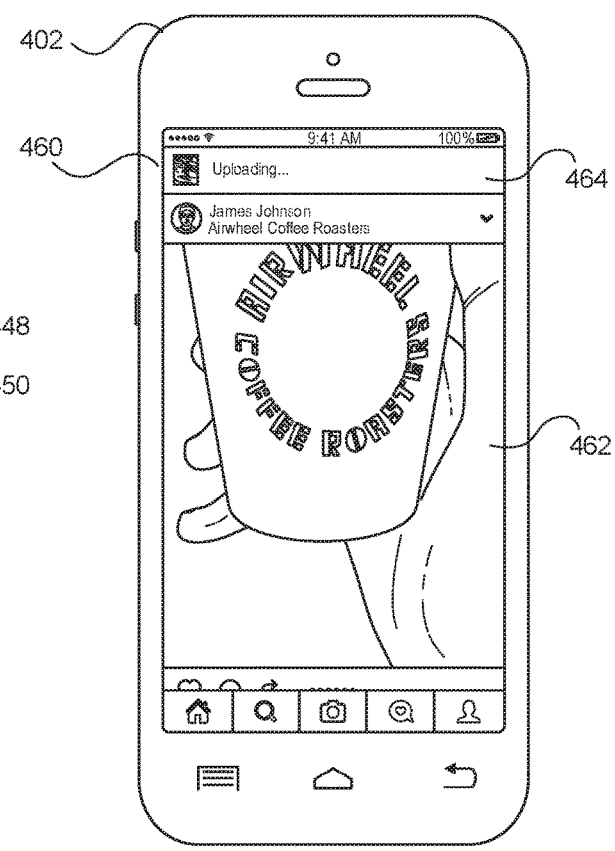
Figure 4G:
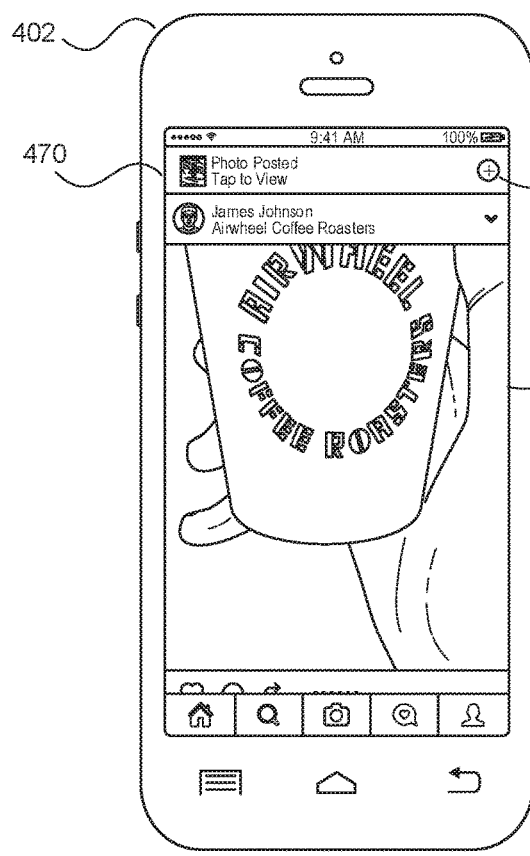
Figure 4H:
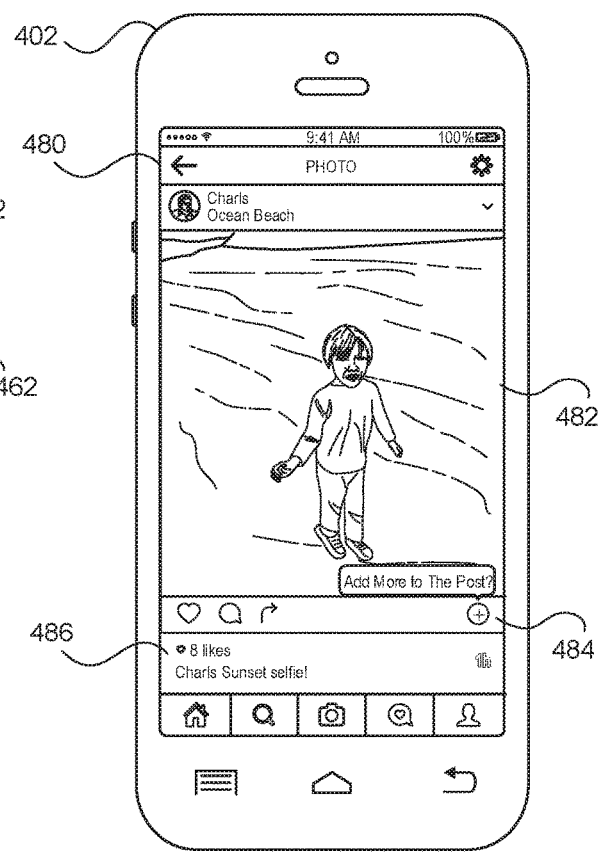

In the example of FIG. 4A, the interface 404 is displaying a posted content item 406 that was authored by the user operating the computing device 402. In some embodiments, the interface 404 includes an option 408 that allows the user to update the post 406 to include additional content items. Once the option 408 is selected, the interface 404 can be updated to present a media tray 410 in which one or more thumbnails of content items are shown, as illustrated in FIG. 4B. The user can select one or more content items from the media tray 410 to be added to the post 406. In some embodiments, once a content item is selected, the user has the option to edit the content item. For example, FIG. 4C illustrates an interface 412 through which the user can select one or more options 414 to edit the content item (e.g., applying a red eye reduction, cropping the content item, adjusting the brightness in the content item, applying an automatic editing tool to the content item, etc.). The interface 412 also includes one or more filter options 416 to be applied to the content item. In some embodiments, the user can provide additional information to be associated with the content item being posted. For example, as illustrated in FIG. 4D, the user can interact with the interface 420 to input a caption 422 that can be shown along with the content item. In some embodiments, the caption 422 is inputted using a virtual keyboard 424 that is presented in the interface 420. In some embodiments, the user can also tag other users of the social networking system that appear in the content item (or that are associated with the content item in some capacity). For example, the user can select a tag option 426 to select the users to be tagged from a list of users. In some embodiments, the user can select a tag option 426 to manually input the names of the users to be tagged. In some embodiments, the user can associate a geographic location with the content item being posted. For example, the user can select the option 428 to provide the name of a geographic location at which the content item was taken or to which the content item otherwise corresponds. In some embodiments, the geographic location is automatically populated in its corresponding field 430. The user can select the share option 432 when ready to publish the content item through the social networking system. In some embodiments, the user is given one or more options for publishing the content item. For example, as illustrated in the example of FIG. 4E, the user can be provided an interface 440 that includes an option 442 to add the content item to the previously published post, an option 444 to publish the content item separately in a new post, and an option 446 to send a copy of the content item directly to one or more users in a private message through the social networking system. The interface 440 also includes an option 448 for tagging users and an option 450 for specifying a geographic location, as described above. In some embodiments, once the content item is submitted for publication, the user is shown an interface 460 in which various content items 462 in the user's content feed are presented, as illustrated in the example of FIG. 4F. The interface 460 can also indicate that the content item submitted for publication is in the process of being published 464. FIG. 4G illustrates an example interface 470 in which various content items 462 in the user's content feed are presented. In the example of FIG. 4G, the interface 470 also provides a notification 472 that the content item that was submitted for publication has been posted. In some embodiments, the user can select, or tap, the region of the interface 470 in which the notification 472 is presented to view the published content item. FIG. 4H illustrates the published content item 482 in an interface 480. As shown in FIG. 4H, the user can select an option 484 to continue adding more content items to the post, as described above. In some embodiments, the interactions and/or captions 486 associated with the original post are propagated to the published content item 482.

FIG. 5 illustrates an example method 500 for sharing content, according to an embodiment of the present disclosure. It should be appreciated that there can be additional, fewer, or alternative steps performed in similar or alternative orders, or in parallel, within the scope of the various embodiments discussed herein unless otherwise stated.

At block 502, an interface is provided in which a content feed of a user is presented, the content feed including at least one first post that was authored by the user and that includes a first content item, wherein the interface is presented on a display screen of a computing device. At block 504, a determination is made that the user has selected an option to update the first post to include one or more additional content items. At block 506, a set of content items is provided for selection through the interface. At block 508, the first post is updated to include at least one content item that was selected by the user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
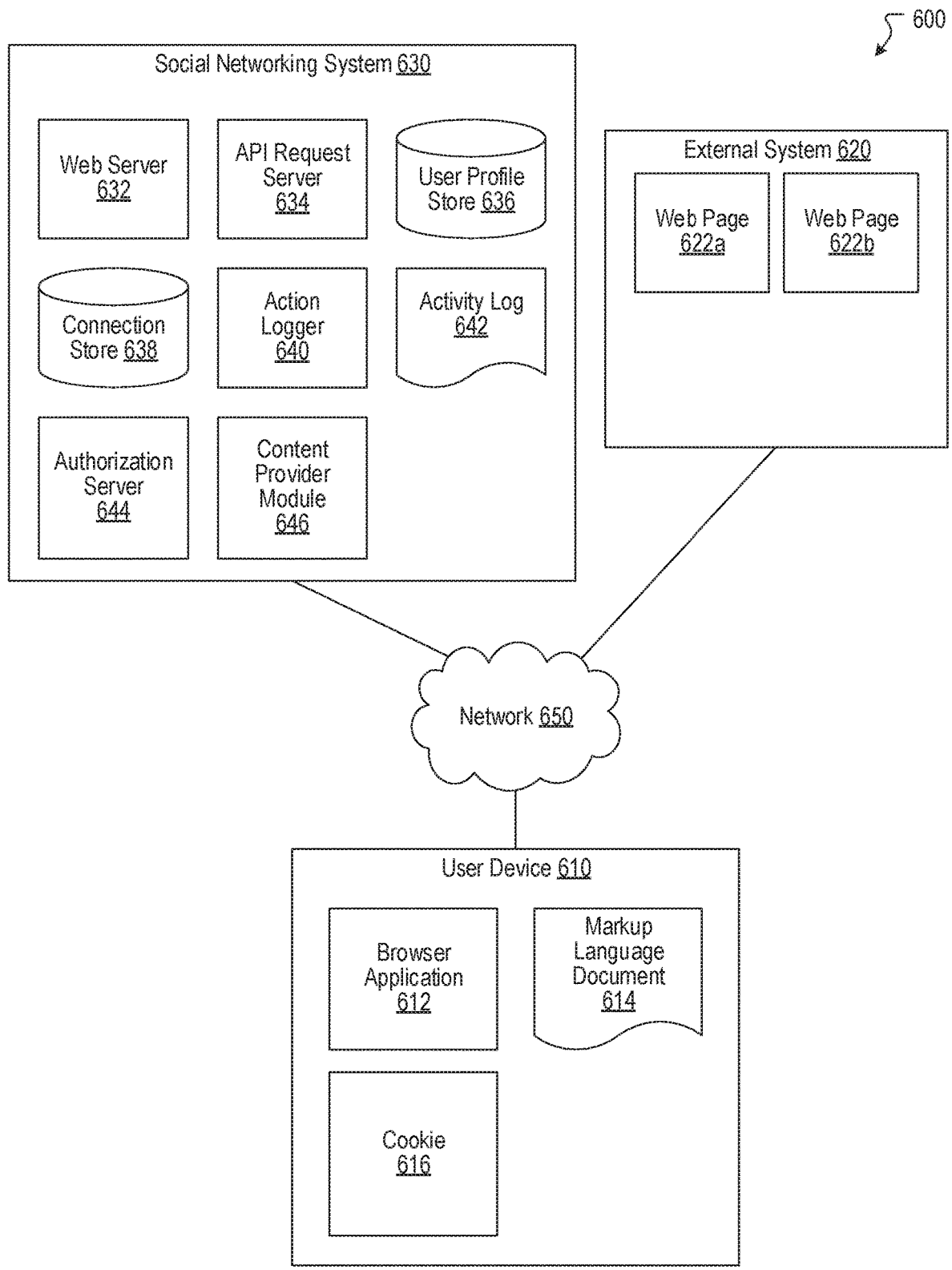
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. As discussed previously, it should be appreciated that there can be many variations or other possibilities.

Hardware Implementation

Figure 7:
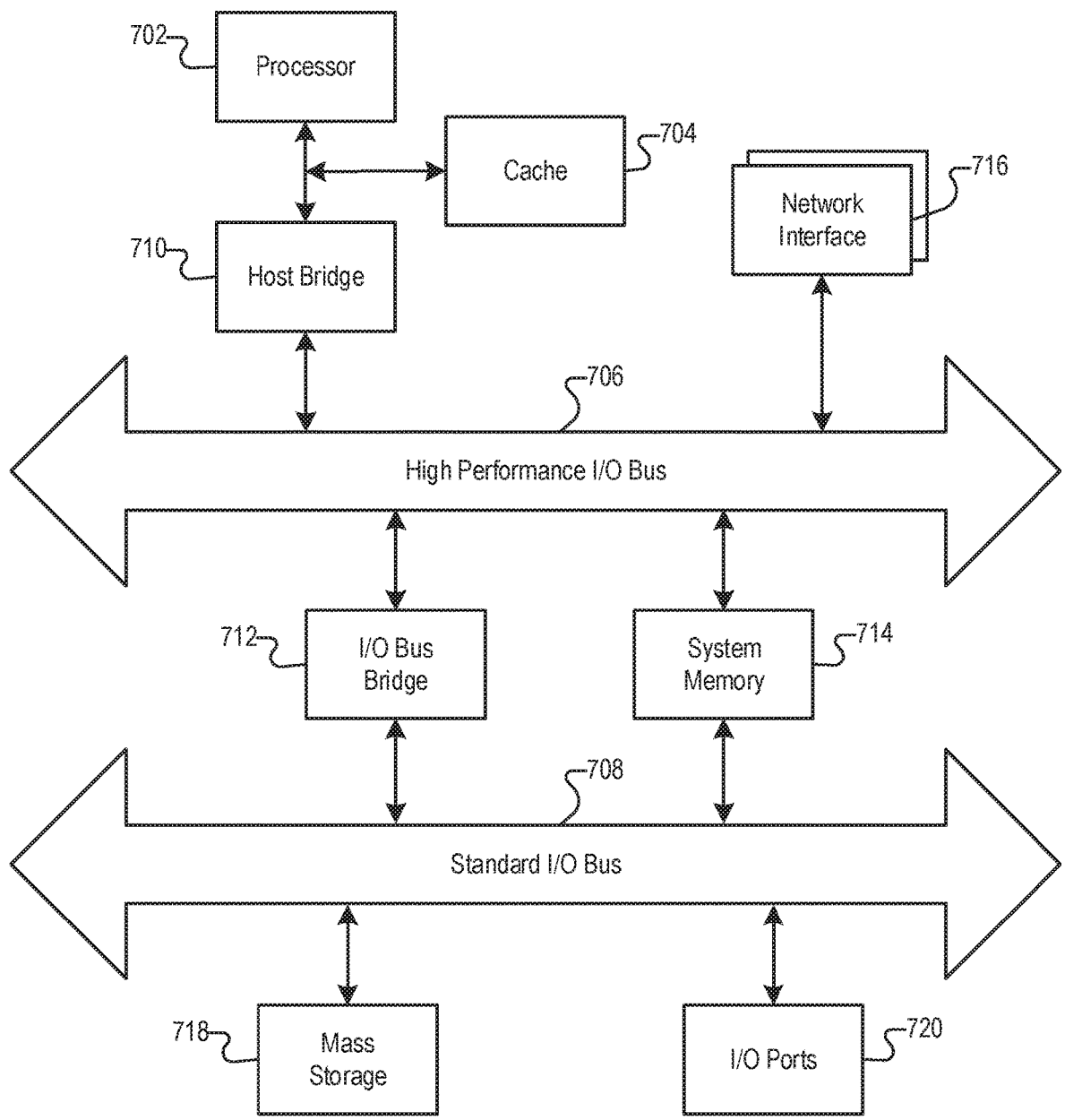
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, an interface for display in which a content feed of a user is provided, wherein the content feed includes a plurality of published posts accessible through a social networking system, the plurality of published posts including a first post that is authored by the user and includes a first content item, the interface including an option to update the published posts;
after the first post is published in the content feed, determining, by the computing system, a set of content items comprising a second content item and a third content item, wherein determining the set of content items further comprises:
determining, by the computing system, a relationship between the first content item of the first post and the second content item based on a machine learning model that is trained to evaluate visual content to determine a threshold overlap between subject matter reflected in the first content item and in the second content item; and determining, by the computing system, a relationship between the first content item of the first post and the third content item based on a geographic location associated with the first content item and the third content item;

in response to a selection of the option to update the published posts in the interface by the user, updating, by the computing system, the interface by causing display of respective thumbnail representations of the set of content items comprising the second content item and the third content item;

in response to a selection of the second content item or the third content item in the updated interface by the user, providing, by the computing system, one or more options to edit the selected second content item or the selected third content item in the interface; and in response to a selection of an option to add to a post in the interface by the user, updating, by the computing system, the published first post to include the selected or edited second content item or the selected or edited third content item, wherein the updated first post is provided in at least the content feed of the user in the interface.

2. The computer-implemented method of claim 1, further comprising:
providing, by the computing system, a media tray through the interface in which respective thumbnails of a set of content items are accessible, wherein content items in the set of content items can be posted to the content feed.

3. The computer-implemented method of claim 1, wherein a ranking of the first post in the content feed is boosted.

4. The computer-implemented method of claim 1, further comprising:
providing, by the computing system, an option in the interface to remove one or more content items from the first post.

5. The computer-implemented method of claim 1, wherein determining the relationship between the first content item of the first post and the second content item further comprises:
determining, by the computing system, that the first content item and the second content item are associated with a same, or similar, geographic location; and
determining, by the computing system, that a timestamp associated with the first content item is within a threshold range of a timestamp associated with the second content item.

6. The computer-implemented method of claim 1, wherein determining the relationship between the first content item of the first post and the second content item further comprises:
determining, by the computing system, that the first post and a second post including the second content item are associated with a same, or similar, caption.

7. The computer-implemented method of claim 1, further comprising:
determining, by the computing system, one or more first user interactions that were received for the first post;
determining, by the computing system, one or more second user interactions that were received for a second post; and associating, by the computing system, the one or more first user interactions and the one or more second user interactions with a single post into which the first post and the second post are merged.

8. The computer-implemented method of claim 1, further comprising:
providing, by the computing system, at least one notification to the user after the second content item is added to the first post.

9. The system of claim 1, wherein determining the relationship between the first content item of the first post and the second content item further comprises:
determining that the first content item and the second content item are associated with a same, or similar, geographic location; and
determining that a timestamp associated with the first content item is within a threshold range of a timestamp associated with the second content item.

10. The system of claim 1, wherein the instructions further cause the system to perform:
providing at least one notification to the user after the second content item is added to the first post.

11. A system comprising:
at least one processor; and
a memory storing instructions that, when executed by the at least one processor, cause the system to perform:
providing an interface for display in which a content feed of a user is provided, wherein the content feed includes a plurality of published posts accessible through a social networking system, the plurality of published posts including a first post that is authored by the user and includes a first content item, the interface including an option to update the published posts;
after the first post is published in the content feed, determining a set of content items comprising a second content item and a third content item, wherein determining the set of content items further comprises:
determining a relationship between the first content item of the first post and the second content item based on a machine learning model that is trained to evaluate visual content to determine a threshold overlap between subject matter reflected in the first content item and in the second content item; and
determining a relationship between the first content item of the first post and the third content item based on a geographic location associated with the first content item and the third content item;
in response to a selection of the option to update the published posts in the interface by the user, updating the interface by causing display of respective thumbnail representations of the set of content items comprising the second content item and the third content item;
in response to a selection of the second content item or the third content item in the updated interface by the user, providing one or more options to edit the selected second content item or the selected third content item in the interface; and
in response to a selection of an option to add to a post in the interface by the user, updating the published first post to include the selected or edited second content item or the selected or edited third content item, wherein the updated first post is provided in at least the content feed of the user in the interface.

12. The system of claim 11, wherein the instructions further cause the system to perform:
providing a media tray through the interface in which respective thumbnails of a set of content items are accessible, wherein content items in the set of content items can be posted to the content feed.

13. The system of claim 11, wherein a ranking of the first post in the content feed is boosted.

14. The system of claim 11, wherein the instructions further cause the system to perform:
providing an option in the interface to remove one or more content items from the first post.

15. A non-transitory computer-readable storage medium including instructions that, when executed by at least one processor of a computing system, cause the computing system to perform a method comprising:
providing an interface for display in which a content feed of a user is provided, wherein the content feed includes a plurality of published posts accessible through a social networking system, the plurality of published posts including a first post that is authored by the user and includes a first content item, the interface including an option to update the published posts;
after the first post is published in the content feed, determining a set of content items comprising a second content item and a third content item, wherein determining the set of content items further comprises:
determining a relationship between the first content item of the first post and the second content item based on a machine learning model that is trained to evaluate visual content to determine a threshold overlap between subject matter reflected in the first content item and in the second content item; and
determining a relationship between the first content item of the first post and the third content item based on a geographic location associated with the first content item and the third content item;
in response to a selection of the option to update the published posts in the interface by the user, updating the interface by causing display of respective thumbnail representations of the set of content items comprising the second content item and the third content item;
in response to a selection of the second content item or the third content item in the updated interface by the user, providing one or more options to edit the selected second content item or the selected third content item in the interface; and
in response to a selection of an option to add to a post in the interface by the user, updating the published first post to include the selected or edited second content item or the selected or edited third content item, wherein the updated first post is provided in at least the content feed of the user in the interface.

16. The non-transitory computer-readable storage medium of claim 15, wherein the instructions further cause the computing system to perform:
providing a media tray through the interface in which respective thumbnails of a set of content items are accessible, wherein content items in the set of content items can be posted to the content feed.

17. The non-transitory computer-readable storage medium of claim 15, wherein a ranking of the first post in the content feed is boosted.

18. The non-transitory computer-readable storage medium of claim 15, wherein the instructions further cause the computing system to perform:
providing an option in the interface to remove one or more content items from the first post.

19. The non-transitory computer-readable storage medium of claim 15, wherein determining the relationship between the first content item of the first post and the second content item further comprises:
determining that the first content item and the second content item are associated with a same, or similar, geographic location; and
determining that a timestamp associated with the first content item is within a threshold range of a timestamp associated with the second content item.

20. The non-transitory computer-readable storage medium of claim 15, wherein the instructions further cause the computing system to perform:
providing at least one notification to the user after the second content item is added to the first post.

* * * * *